United States Patent
Falk

(10) Patent No.: US 8,379,418 B2
(45) Date of Patent: Feb. 19, 2013

(54) POWER CONVERTER START-UP CIRCUIT

(75) Inventor: Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 572 days.

(21) Appl. No.: 12/618,426

(22) Filed: Nov. 13, 2009

(65) Prior Publication Data

US 2010/0124087 A1 May 20, 2010

(30) Foreign Application Priority Data

Nov. 15, 2008 (EP) .................................. 08019975

(51) Int. Cl.
*H02M 7/5375* (2006.01)
(52) U.S. Cl. .............................. 363/49; 363/71; 323/906
(58) Field of Classification Search .................... 363/49, 363/71, 131; 323/906, 901, 233; 361/16
See application file for complete search history.

(56) References Cited

U.S. PATENT DOCUMENTS

| | | | | |
|---|---|---|---|---|
| 4,451,743 | A * | 5/1984 | Suzuki et al. ................. | 307/110 |
| 4,689,734 | A * | 8/1987 | Lang ............................. | 363/59 |
| 6,111,767 | A * | 8/2000 | Handleman .................. | 363/95 |
| 6,281,485 | B1 * | 8/2001 | Siri ............................. | 250/203.4 |
| 6,680,856 | B2 | 1/2004 | Schreiber | |
| 7,030,512 | B2 * | 4/2006 | Krein ............................. | 307/77 |
| 7,957,168 | B2 * | 6/2011 | Zacharias et al. ............. | 363/132 |
| 2007/0273338 | A1 * | 11/2007 | West .............................. | 323/222 |
| 2007/0291522 | A1 * | 12/2007 | Toba et al. .................... | 363/132 |
| 2008/0094867 | A1 | 4/2008 | Muller et al. | |

FOREIGN PATENT DOCUMENTS

| | | |
|---|---|---|
| DE | 202006001063 | 4/2006 |
| EP | 1244203 A2 | 9/2002 |
| EP | 1463188 A2 | 9/2004 |
| EP | 1852963 A1 | 11/2007 |
| EP | 1870996 A1 | 12/2007 |
| EP | 1914857 A1 | 4/2008 |
| JP | 11312022 A | 11/1999 |

OTHER PUBLICATIONS

Machine translation of JP11312022.*
European Search Report for EP 08019975.5, dated Apr. 29, 2009.

* cited by examiner

*Primary Examiner* — Harry Behm
(74) *Attorney, Agent, or Firm* — Leydig, Voit & Mayer, Ltd.

(57) ABSTRACT

A power converter arrangement configured to convert a direct voltage into an alternating voltage to be supplied to a grid includes a photovoltaic generator configured to generate the direct voltage, a voltage intermediate circuit, a main power converter connected in series with a bypass switch, a maximum power point controller configured to set a maximum power point voltage, and at least one voltage-limited additional circuit configured to be active during a start-up phase of the photovoltaic generator. The at least one voltage-limited additional circuit and the main power converter are configured as a voltage divider in parallel with the photovoltaic generator. The at least one voltage-limited additional circuit is configured as a capacitive voltage divider having a first capacitor and an intermediate circuit capacitor connected in series.

15 Claims, 7 Drawing Sheets

POWER CONVERTER START-UP CIRCUIT

CROSS-REFERENCE TO PRIOR APPLICATIONS

Priority is claimed to European Patent Application No. 08019975.5, filed on Nov. 15, 2008, which is hereby incorporated by reference herein.

FIELD

The invention relates to a power converter arrangement for converting a direct voltage generated by a photovoltaic generator into an alternating voltage to be fed into a grid, and to a method for converting a direct voltage into an alternating voltage to be supplied to a grid.

BACKGROUND

Single-phase or three-phase power converters which convert direct voltage from the source into grid-compatible alternating voltage, for a solar or photovoltaic generator with a high output voltage exist. An intermediate circuit capacitor is conventionally connected downstream from the generator and is followed by the power converter. A sine-wave filter is connected at the output of the power converter. The energy is fed into the grid via a transformer.

When photovoltaic systems are started up, the high open-circuit voltage of the generator is problematic. In open-circuit operation, the solar generator has a high output voltage. The open-circuit voltage is generally more than 20% higher than at the operating point during feeding, what is known as the MPP (maximum power point) voltage. In the MPP tracking process, a generator operating point of optimal power production is set. The elevated generator voltage during open-circuit operation must not cause any damage to the electronic systems during the start-up process.

Additional external circuitry, such as a resistance chopper, is also typically used. The resistance chopper is connected in parallel with the DC intermediate circuit or parallel with the power converter input and reduces the intermediate circuit voltage during the start-up phase. The drawbacks of these devices are the high losses experienced during the start-up phase and the high load on the resistance chopper.

In another solution described in DE 20 2006 001 063 U1, a step-down converter is connected upstream of the three-phase power converter. In this case, the step-down converter reduces the photovoltaic generator voltage to a permissible value if necessary. The drawback is that when the generator voltage is low, the step-down converter switch must be permanently closed, thus causing considerable forward power losses. In addition, the switch and diode of the step-down converter must be configured for the maximum generator voltage, i.e. the open-circuit voltage. This thus requires components of greater electric strength than required in operation at the MPP operating point. These components are more expensive and exhibit higher power loss. According to DE 20 2006 001 063 U1, the switches of the three-phase power converter are clocked at mains frequency, which is a drawback since sinusoidal current is not supplied.

SUMMARY

An aspect of the present invention is to provide a power converter arrangement including an additional circuit for starting up a power converter for a PV generator with a high open-circuit voltage which is characterised by a high degree of reliability but also low losses both during the start-up process and also in feed mode at the MPP point.

In an embodiment, the present invention provides a power converter arrangement configured to convert a direct voltage into an alternating voltage to be supplied to a grid. The arrangement includes a photovoltaic generator configured to generate the direct voltage, a voltage intermediate circuit, a main power converter connected in series with a bypass switch, a maximum power point controller configured to set a maximum power point voltage, and at least one voltage-limited additional circuit configured to be active during a start-up phase of the photovoltaic generator so as to limit a voltage input to the main power converter during the start-up phase so as to maintain the voltage input to the main power converter below a maximum power point voltage limit. The at least one voltage-limited additional circuit and the main power converter are configured as a voltage divider in parallel with the photovoltaic generator. The at least one voltage-limited additional circuit is configured as a capacitive voltage divider having a first capacitor and an intermediate circuit capacitor connected in series.

BRIEF DESCRIPTION OF THE DRAWINGS

The present invention will now be further described and illustrated with reference to exemplary embodiments and the accompanying drawings, in which.

DETAILED DESCRIPTION

Figure 1:
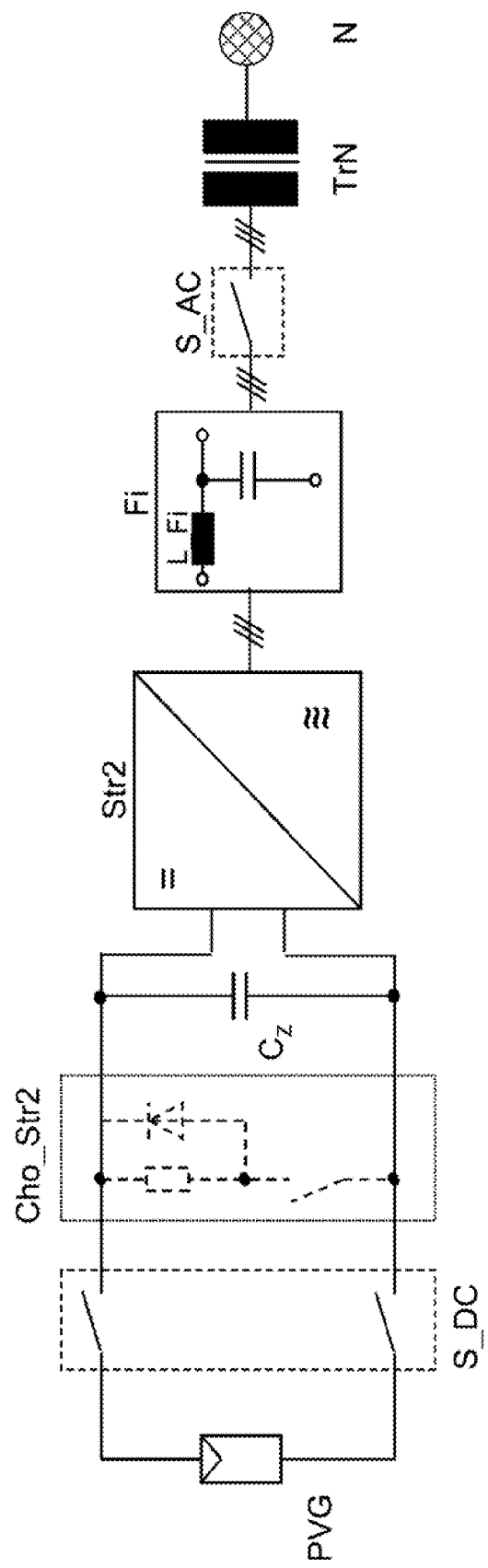
FIG. 1 shows a photovoltaic system with a general construction including a resistance chopper as the additional circuit.

An aspect of the present invention provides an additional circuit which is active during the start-up phase and reduces the voltage at the power converter input during the start-up phase. When the open-circuit voltage of the photovoltaic generator is higher than the power convener voltage, the additional circuit, which is in practice configured as an auxiliary circuit, limits the power converter voltage until the power converter loads the photovoltaic system in such a way that the MPP voltage is reached and the power converter voltage at the MPP operating point is not exceeded. The advantage of this is that no chopper is required for the rated power. According to an embodiment of the present invention, the additional circuit is preferably active during the start-up phase. However, the circuit may also be active in the case of notches in the mains voltage or in the "power limiting" mode.

According to an aspect of the present invention, the voltage applied to the input of the power converter is reduced, for example by a voltage divider. If a voltage divider is used for example, the main power converter is only connected to part of the voltage divider. In this way, the applied voltage and the converted power at this operating point are lower than in the feed mode.

An advantage of the present invention is that it is no longer necessary to configure semiconductors in the power converter for the maximum possible generator voltage, i.e. components of lower electric strength can be used, which reduces the circuit costs. Components of lower electric strength also frequently exhibit a lower degree of loss, thus improving efficiency at the MPP point. Instead of being configured for open-circuit voltage, the semiconductors in the power convener, specifically a bridge circuit and/or a step-up converter, are configured for an MPP operating point.

In this case, a method is provided in which the output voltage of the power converter is synchronised with the mains voltage during the start-up phase and the main power converter is connected to the grid by AC switching members once synchronisation is complete.

A DC switching member is expediently located between the photovoltaic generator and the intermediate circuit capacitor. An AC switching member is preferably positioned between a sine-wave filter and a transformer for example. The switching members are configured preferably as contactors. When the system is started up, the DC switching member is initially closed. The power converter is subsequently activated, i.e. the switches of the power converter begin to operate in the switching mode. The output voltage of the power converter is now synchronised with the mains voltage. When the output voltage of the power converter is synchronised with the grid, the AC switching members are closed and the power converter feeds into the grid, provided that the photovoltaic generator has sufficient power available.

The power converter arrangement according to an embodiment of the present invention provides that the additional circuit is connected to a switch, in particular a bypass switch, which is open during the start-up phase and is closed after the start-up phase, is located in a current path between the generator and the main power converter and is connected parallel to at least one component of the additional circuit. In principle, a semiconductor member for example, which bridges a component of the divider in such a way that no division takes place, may be connected to the voltage divider. However, it is beneficial for the bypass switch to be a mechanical switch, in particular a contactor or a relay. In contrast to a semiconductor, there is no voltage drop at the closed contactor or relay contacts so no loss occurs.

Therefore, in contrast to the solution described in DE 20 2006 001 063 U1, forward power losses are prevented when the bypass switch bypasses at least one step-down converter switch, it is possible to short-circuit the step-down converter switch alone or together with a choke connected in series.

Alternatively, a voltage divider which is arranged parallel to the generator can be used. The voltage is divided between the voltage across the additional circuit and the input voltage of the main power converter so the full open-circuit voltage is not applied to the main power converter and only 80% is applied for example. Voltage division takes place during the start-up phase when the bypass switch bypasses part of the voltage divider at the MPP operating point set, i.e. in continuous operation.

In an advantageous development of the voltage divider solution, it is provided that the additional circuit, configured as a capacitive voltage divider, includes a first capacitor and an intermediate circuit capacitor connected in series, the bypass switch being connected in series to the main power converter. The advantage of capacitors over ohmic resistors is that energy is stored in the capacitors and not converted into lost heat, with the result that no heating of the circuit occurs on the one hand and efficiency is improved on the other.

The energy stored is preferably recovered by an auxiliary power converter or a DC/DC converter.

Therefore, in one embodiment of the present invention, the additional circuit includes an auxiliary power converter in particular having a lower output than the main power converter, the auxiliary power converter being active during the start-up phase. The auxiliary power converter is expediently connected directly to the grid so that it feeds power directly into the grid. The auxiliary power converter functions as a load and is therefore preferably synchronised before synchronisation takes place in the main power converter. It is also preferable to dispense with the MPP control system in the auxiliary power converter to allow it to fulfil its function. The auxiliary power converter also preferably does not have a step-up converter. Relatively little energy is lost during the start-up process in this comparatively cost-effective solution, so the DC/AC inverter is highly efficient in the start-up phase.

In principle, the auxiliary power converter does not only have to be used during the start-up phase. It could therefore conceivably also be used during periods of peak voltage, for example in summer, on account of particularly high solar radiation.

Alternatively, the additional circuit can also include a resistance chopper which also acts as a load.

There is a further alternative for the aforementioned DC/DC converter. The DC/DC converter is configured so as to be electrically isolated. The output thereof is coupled back to the intermediate circuit capacitor so the charge of the first capacitor is recirculated to the intermediate circuit capacitor.

It is also possible for a resistance voltage divider to be connected in parallel with the generator instead of a capacitive voltage divider, the voltage being divided between a first series resistor and a second series resistor positioned parallel to the main power converter. Voltage division is effective during the start-up phase. The advantage of this solution is that no additional load is required and it is possible to use a low number of components. In order to switch off the divider after the start-up process, it is beneficial if the bypass switch is connected in parallel with the first series resistor and a further switch, in particular a mechanical switch, preferably a relay or a contactor, is connected in series to the second series resistor but still in parallel with the main power converter. In this way, no current flows through the resistors at the MPP operating point set.

To ensure that it is not possible to exceed the permitted voltage of the inverter semiconductor, it is advantageous for a pulse pattern of activation signals, in particular high-frequency signals, to be set for semiconductor switches of the main power converter when connecting the bypass switch in such a way that the photovoltaic generator is loaded to such an extent that the DC source voltage of the generator breaks down to a value which, at most, corresponds to the maximum MPP voltage. The pulse pattern may be a PWM pattern or a rectangular pattern depending on the mains frequency. Semiconductor switches of a half-bridge or complete bridge may for example also be closed in an overlapping manner for a short period of time to apply an additional load on the generator and thus avoid high generator voltage.

FIG. 1 is a circuit diagram of a solar or photovoltaic generator PVG with an open-circuit output voltage of, for example, 250 to 3,000 Volts, preferably 1,000 to 1,700 Volts. This generator is connected to a three-phase power converter which may also be a single-phase power converter. The power converter Str2 converts the direct voltage of the generator PVG into a grid-compatible alternating voltage of, for example, 230/400 V Volts, 50 Hz or 60 Hz.

The power converter includes for example a step-up converter and/or step-down converter, a half-bridge or full-bridge circuit which is synchronised with the grid and an MPP control system, it being possible for the converter to be provided with or without a transformer. It is also possible to connect bipolar intermediate circuits and/or two or more generators in series so that +, GND, − is obtained.

An intermediate circuit capacitor CZ is connected downstream of the generator PVG and is followed by the power converter Str2. A sine-wave filter Fi is connected to the output of the power converter Str2. Power is fed into the grid N via a transformer TrN. However, it is also possible to feed energy without the transformer TrN.

A switching means or a DC switching member S_DC is positioned between the generator PVG and the intermediate circuit capacitor CZ. The switching member has a first switch located in the positive path and a second switch located in the negative path, thus enabling electrical isolation be achieved. A further switching means or AC switching member S_AC is located between the sine-wave filter Fi and the transformer TrN. This AC switching member includes three or four switches for L1 to L3 and optionally for an N conductor so that electrical isolation can also be achieved in this case. The switching members S_DC, S_AC are preferably formed as contactors.

When the system is started up, the DC switching member S_DC is initially closed. The power converter Str2 is then activated, i.e. the switches of the power converter begin to operate in the switching mode. The output voltage of the power converter Str2 is now synchronised with the mains voltage. Once the power converter output voltage is synchronised with the grid, the AC switching member S_AC is closed and the power converter Str2 feeds power into the grid N, provided that the generator PVG has enough power available.

In the open-circuit mode, the generator, which may have crystalline or amorphous cells, has an output voltage which is for example 15 to 30%, preferably approximately 20% higher than at the operating point when feeding into the grid or than the MPP voltage. The open-circuit voltage is produced when the DC switching member S_DC is open.

An additional circuit, such as a resistance chopper Cho_Str2 parallel to the DC intermediate circuit or parallel to the input of the power converter, would in the context of the invention reduce the generator voltage to a value not greater than the MPP voltage when the DC switching member is closed. However, this entails the drawbacks of high losses incurred during the start-up phase and the high nominal power of the resistance chopper.

The additional circuit according to an embodiment of the present invention or a portion of the additional circuit Z1 according to FIGS. 3 to 7 is bypassed when the main power converter Str2 is synchronised with the grid N and power is fed into the grid N. If for example a voltage divider is used as the additional circuit Z1 or Z1 and Z2 (FIG. 7), the portion of the voltage divider not associated with the main power converter Str2 is bypassed when the main power converter is synchronised with the grid N and power can be fed into the grid N.

The main power converter Str2 is activated in such a way that a pulse pattern is retained at the moment in which the additional circuit is deactivated so that the generator PVG is loaded to a sufficient extent to ensure that the voltage is considerably lower than the open-circuit voltage. After this point the system transitions into the normal feed mode. It is should be noted that, when the power converter Str2 operates synchronously with the grid, the current and thus the power are dependent on the voltage drop caused by the sine-wave filter choke LFi. Since the mains voltage and choke voltage phasors are perpendicular to one another, small changes in the power converter output voltage result in a large change in voltage at the choke L when power is fed with a power factor value of close to 1.

Figure 2:
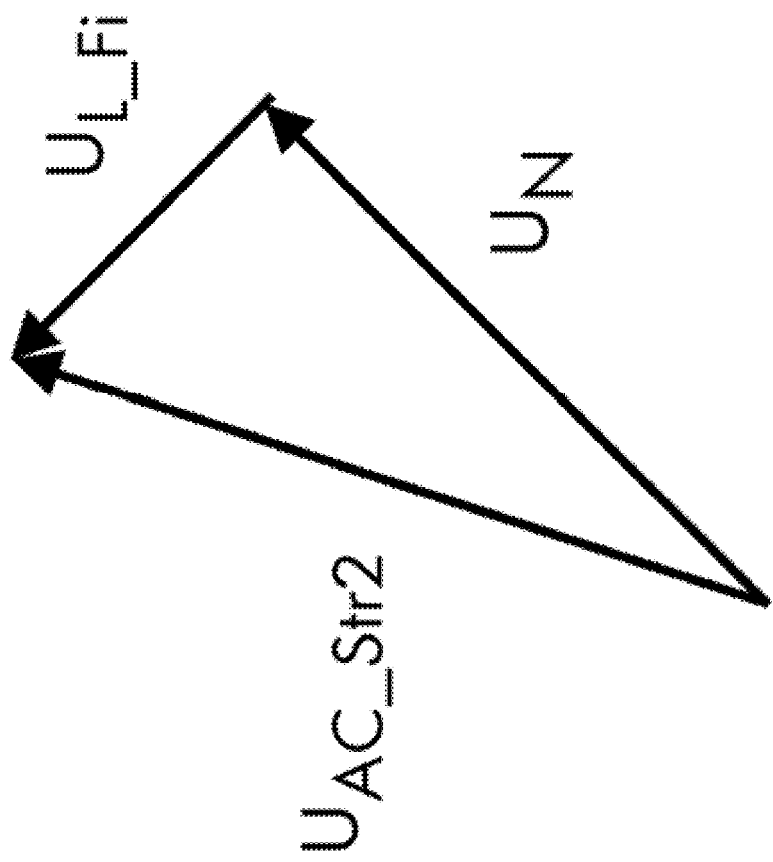
FIG. 2 is a voltage phasor diagram of a plurality of voltages.

FIG. 2 is a phasor diagram showing the mains voltage UN, filter choke voltage UL_Fi and power converter output voltage UAC_Str2.

If the pulse pattern of the power converter Str2 is held constant and the DC intermediate circuit voltage increases strongly, the current and thus the power at the output of the power converter Str2 increases. The voltage of the generator PVG will then break down to a specific value once the high-resistance decoupling has been bypassed. This means that the control means must be set in such a way that the PV generator will be loaded sufficiently once S1 is closed.

Figure 3:
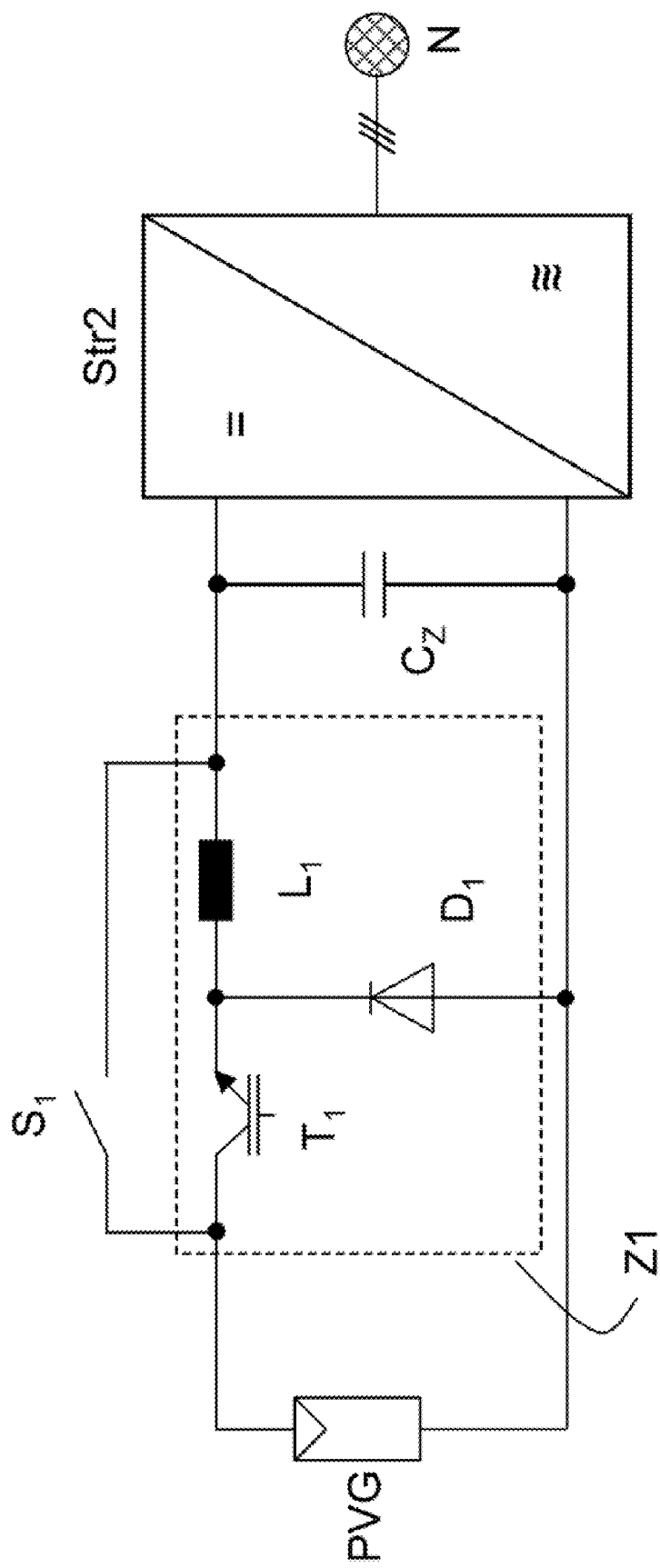
FIG. 3 shows an embodiment of the present invention including a step-down converter.

FIG. 3 shows an embodiment of the present invention. The additional circuit Z1 is connected upstream of the power converter Str2. This additional circuit Z1 corresponds to a step-down converter with a switch T1, a choke L1 positioned in series and a diode D1 which is attached at the point of common coupling of the two elements T1 and L1 towards negative in the reverse direction. The switch T1 and optionally also the choke L1 of the step-down converter may be bypassed by an additional bypass switch S1, for example a mechanical switch. The step-down converter reduces the generator voltage to a permissible voltage for the semiconductor of the power converter Str2.

It is advantageous that there is minimal power loss when the step-down converter is in operation. The step-down converter operates in such a way that a voltage which is smaller or equal to the maximum permissible MPP voltage is applied to the capacitor CZ. Since there is no resistance, no ohmic loss is experienced.

In contrast to the power converter, the semiconductor components, i.e. the switch T1 and the diode D1 are to be configured for the full open-circuit voltage, for example 1,700 V semiconductors are preferably used, whereas the permitted reverse voltage strength of the semiconductors of the power converter is lower.

The switch S1 may also be a selector switch or a changeover switch which connects for example an input of the power converter Str2 either to the step-down converter or directly to the generator PVG.

Figure 4:
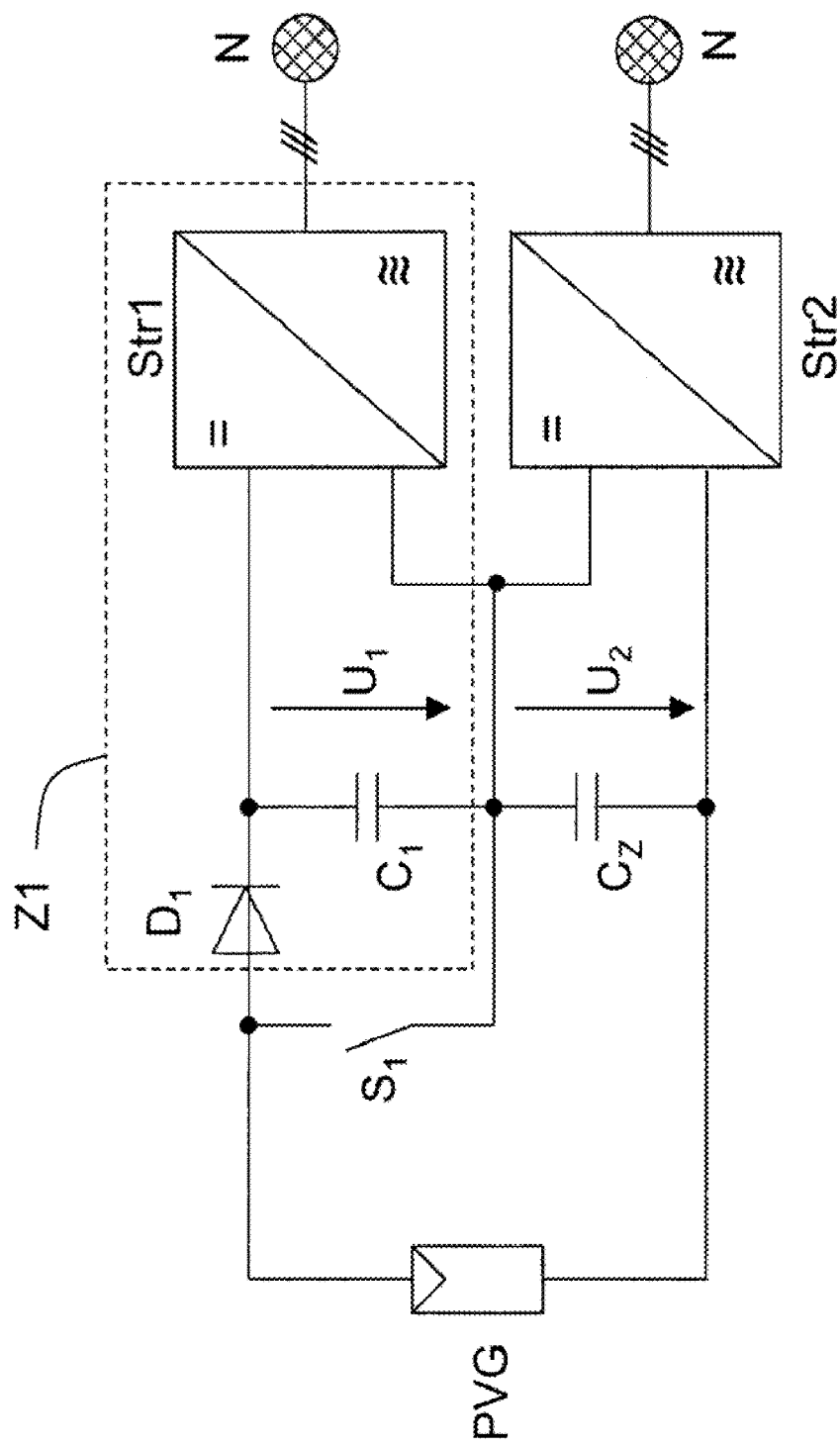
FIG. 4 shows an embodiment of the present invention including an auxiliary power converter.

FIG. 4 shows a further embodiment of the present invention including a capacitive voltage divider having two capacitors C1 and CZ which are connected in series and have two power converters Str1 and Str2.

The additional circuit Z1 includes a diode D1, a capacitor C1 and a power converter Str1. The capacitors C1 and CZ are in this case connected in such a way that they act as a capacitive voltage divider. One power converter Str1 or Str2 is connected in parallel downstream of the capacitors C1 and CZ respectively. The capacitor C1 can be connected so as to be active or bypassed by a bypass switch S1. A diode is connected in the forward direction in a current path between the bypass switch S1 and the first capacitor C1. This diode D1 prevents the flow of current in the direction of the switch S1 and is arranged in such a way that current only flows through it when the bypass switch S1 is open.

During the synchronisation phase, the switch S1, for example a mechanical switch, is open. Both power converters Str1 and Str2 are activated. In this case, the power is divided between the input voltages U1 and U2 of the power converters Str1 and Str2 in such a way that the voltage U2 assumes a value which does not exceed a predetermined maximum value. In this case, the diode D1 prevents a flow of current in the direction of the generator PVG.

The main power converter Str2 is activated in such a way that a pulse pattern is retained at the moment in which a part of the voltage divider is bypassed so the generator PVG is loaded to a sufficient extent that the voltage is considerably lower than the open-circuit voltage. The voltage U2 corresponds to the input voltage of the power converter Str2.

The switch S1 can be closed after the synchronisation phase. The power converter Str1 is no longer activated.

In principle, the switch S1 can remain open and the power converter Str1 can remain active and also feed power into the grid N, as indicated in FIG. 4 by the connection between the power converter Str1 and the grid N. In principle, the outputs of both power converters Str1 and Str2 can also be connected in parallel to supply power.

In this embodiment, the output of the power converter Str1 is preferably lower, preferably at least four times lower than that of the power converter Str2. In this case, the power converter Str1 is preferably active during the start-up phase. If Str1 is also used to supply power, it is not necessary to use a three-phase power converter.

A resistance chopper can also be used instead of the power converter Str1 in FIG. 4.

Figure 5:
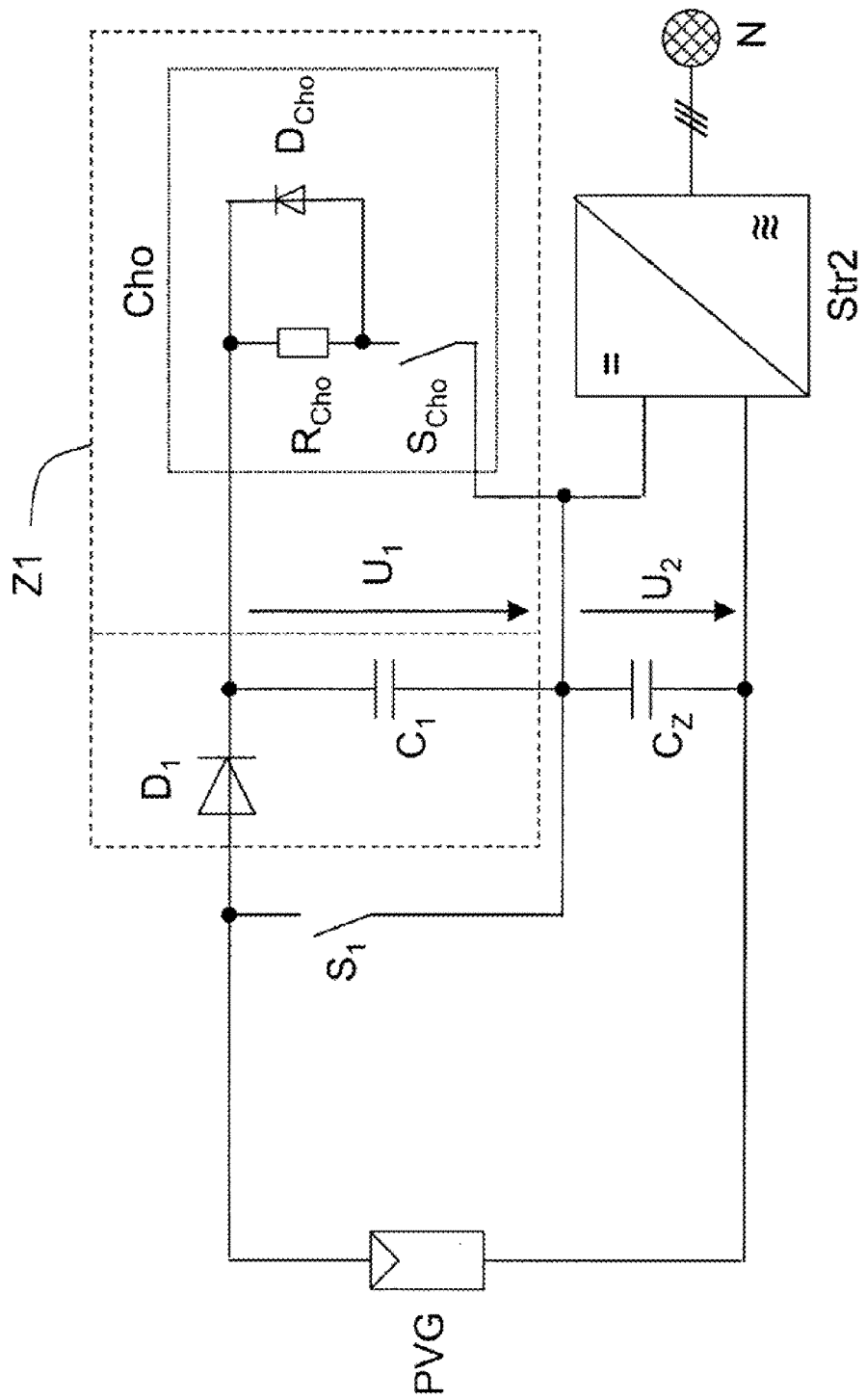
FIG. 5 shows an embodiment of the present invention including a resistance chopper.

FIG. 5 shows a corresponding arrangement including a capacitive voltage divider having a power converter and a resistance chopper Cho, including a resistor RCho, a switch SCho and a diode DCho. The diode DCho is positioned antiparallel to the resistor RCho and in series with the chopper switch SCho, which is a clocked semiconductor switch. The additional circuit Z1 in this case includes the diode D1, the capacitor C1 and the resistance chopper Cho. The additional circuit Z1 can also be bypassed by the switch S1.

The switch S1 is open during the synchronisation phase. The voltage U1 and thus the ratio of the voltages U1 and U2 is set by the resistance chopper Cho. In this case, the voltage U2 assumes values which do not exceed a predetermined maximum. The diode D1 thus prevents a flow of current in the direction of the generator PVG. After the synchronisation phase, S1 is closed and the chopper Cho no longer operates.

The advantage of this method is that the chopper Cho can be configured so as to be substantially smaller than a chopper Cho_Str2 positioned parallel to the input of the power converter Str2, as shown in FIG. 1. In this way, the loss incurred in the chopper Cho is also lower.

Figure 6:
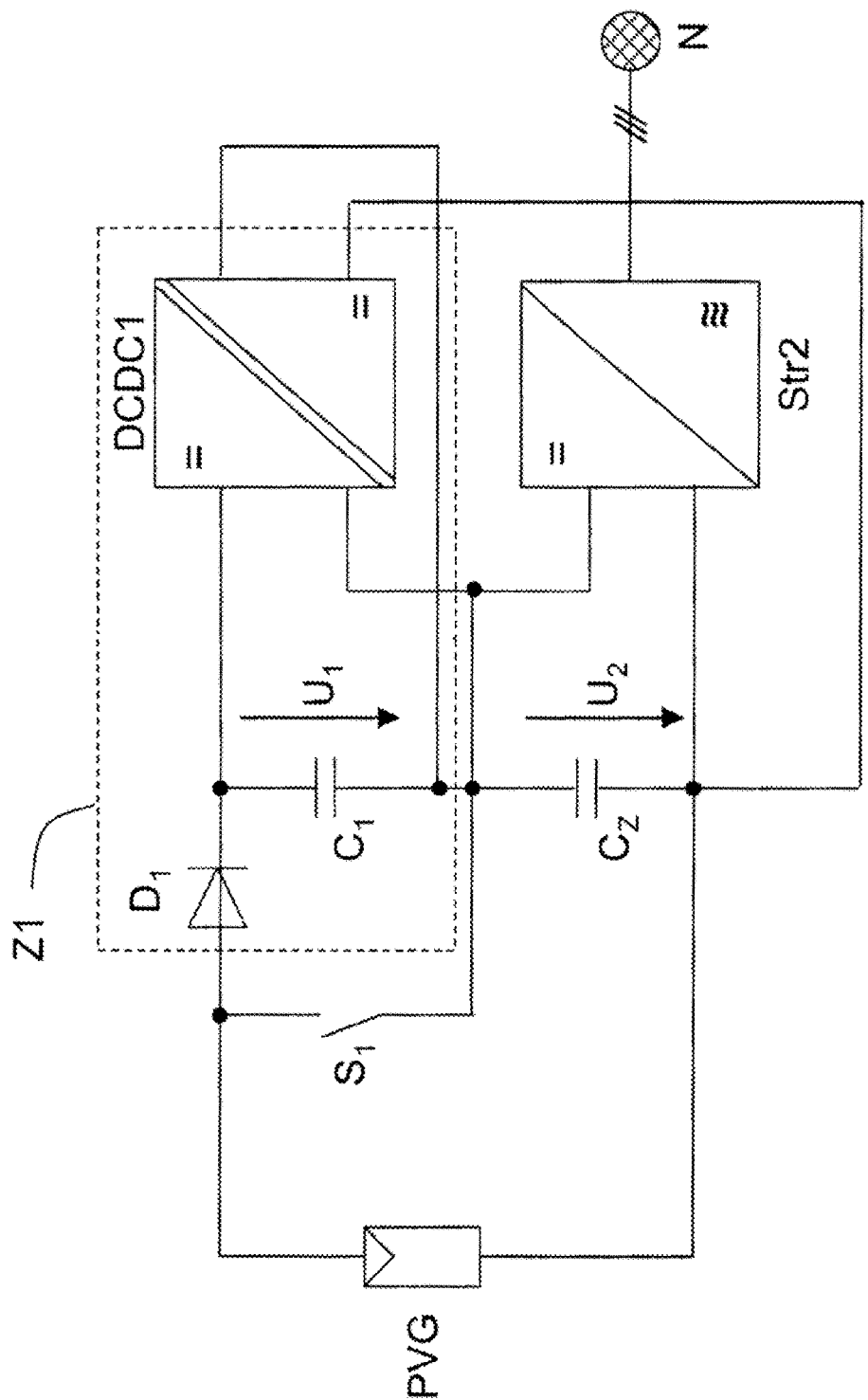
FIG. 6 shows an embodiment of the present invention including a d.c./d.c. converter.

FIG. 6 shows a solution having an electrically isolated DC/DC converter which feeds back into the input. In this embodiment of the present invention, the power converter Str1 shown in FIG. 4 is replaced by an electrically isolated DC/DC converter DCDC1, the positive output of which is connected to the positive terminal of the intermediate circuit capacitor CZ and the negative output of which is connected to the negative terminal of the intermediate circuit capacitor CZ. In this way, the DC/DC converter DCDC1 feeds power into or back into the intermediate circuit capacitor CZ. The additional circuit Z1 includes the diode D1, the capacitor C1 and the DC/DC converter DCDC1 and can be bypassed by the switch S1.

In the synchronisation phase, the switch S1 is open and the DC/DC converter DCDC1 feeds power into the capacitor CZ. In contrast to the solutions having the power converter Str1 as shown in FIG. 4 or having the chopper Cho as shown in FIG. 5, losses are encountered in the DC/DC conversion. In the solutions shown in FIG. 4 and FIG. 5, the power representing the difference between the open-circuit and MPP voltages is converted into lost power in the power converter Str1 or in the chopper Cho. The switch S1 is closed after the synchronisation phase and the d.c./d.c. converter DCDC1 no longer operates.

Figure 7:
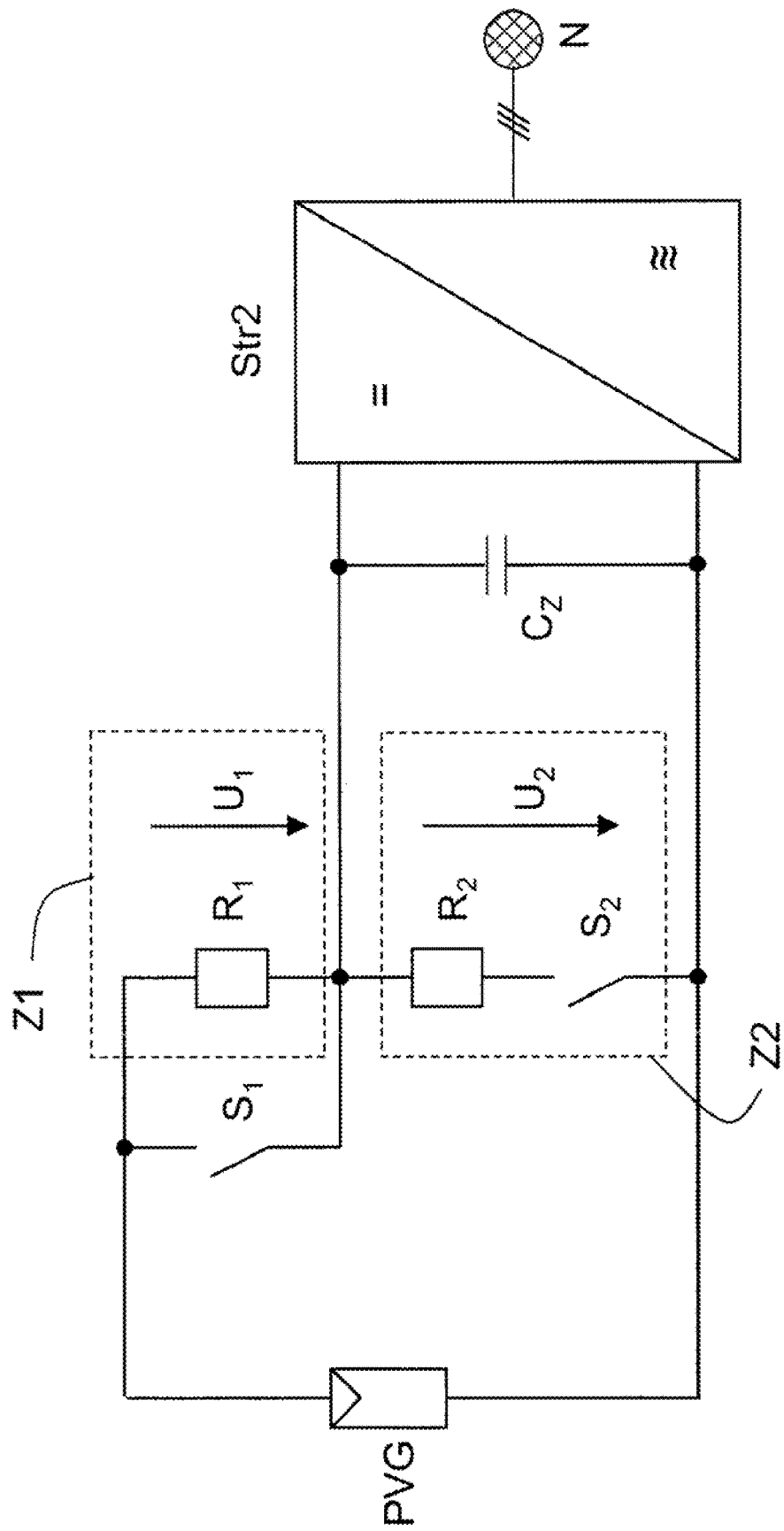
FIG. 7 shows an embodiment of the present invention including a resistance voltage divider.

A further embodiment of the present invention is shown in FIG. 7. The additional circuit Z1 in this case includes a resistor R1 and is supplemented by a further additional circuit Z2. This additional circuit Z2 includes a series connection of a resistor R2 and a switch S2. During the start-up phase, the switch S1 is opened but the switch S2 is closed. In this case, the resistors R1 and R2 form a resistance voltage divider, enabling the voltage U2 to be limited. After the start-up process is complete, i.e. when synchronisation is complete, the first switch S1 is closed and the second switch S2 is opened. The main power converter Str2 is in this case also activated in such a way that a pulse pattern is set at the moment in which part of the voltage divider is bypassed in such a way that the generator PVG is loaded to a sufficient extent to ensure that the voltage is considerably lower than the open-circuit voltage. The voltage U2 corresponds to the input voltage of the power converter Str2 and is at a maximum before the synchronisation phase since the voltage U2 falls during the synchronisation phase (open-circuit loss).

The use of the two additional resistors R1, R2 and two additional switches S1, S2, preferably mechanical switches, results in additional complexity, costs and space requirements, but only the first switch S1 is strongly loaded, specifically during the start-up phase, so the benefits outweigh the complexity, costs and space requirements.

Power is converted in the resistors but the losses are relatively low since it is only necessary to supply current for the synchronisation process. The use of the first switch S1 means that an additional component is always present in the DC circuit during MPP operation. However, the simple construction is an advantage.

The present invention is not limited to this example. It is thus clear that the basic construction which is described and shown in FIG. 1 and includes switching members S_DC, S_AC, the filter Fi and the transformer TrN can be combined with a circuit as shown in FIGS. 3 to 7. As an alternative to the bypass switch, it is also possible to use a non-bypassing switch which is configured for example as a changeover switch and switches either to the divided or non-divided connection point. The task of the switch S1 is to activate or deactivate the additional circuit Z1. This does not necessarily have to be achieved by short-circuiting the additional circuit Z1.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS

PVG photovoltaic generator
Str1 auxiliary power converter
Str2 main power converter
CZ intermediate circuit capacitor
Fi sine-filter choke
TrN transformer
S_DC d.c. switching member
S_AC a.c. switching member
L1-L4 switches
Cho_Str2 resistance chopper
N grid
Z1 first additional circuit
Z2 second additional circuit
L choke
UN mains voltage
UL_Fi filter choke voltage
UAC_Str2 power converter output voltage
S1 bypass switch
D1 diode C1 capacitor
U1, U2 input voltages
Cho resistance chopper
DCDC1 DC/DC converter
R1 first series resistor
R2 second series resistor
T1 step-down converter switch

The invention claimed is:

1. A power converter arrangement configured to convert a direct voltage into an alternating voltage to be supplied to a grid, the arrangement comprising:
 a photovoltaic generator configured to generate the direct voltage;
 a main power converter;
 a maximum power point controller configured to set a maximum power point voltage;
 at least one voltage-limiting additional circuit configured to be active during a start-up phase of the photovoltaic generator so as to limit a voltage input to the main power converter during the start-up phase below a maximum power point voltage limit; and
 a bypass switch connected in series with the main power converter and being coupled to the at least one voltage-limiting additional circuit, the bypass switch being configured to activate and deactivate the at least one voltage-limiting additional circuit,
 wherein the at least one voltage-limiting additional circuit is configured as a capacitive voltage divider in parallel with the photovoltaic generator and includes a first capacitor and an intermediate circuit capacitor connected in series, the capacitive voltage divider being configured to divide the direct voltage between the capacitors such that the voltage input to the main power converter corresponds to the divided direct voltage at the intermediate capacitor.

2. The power converter arrangement as recited in claim 1, wherein the bypass switch connected between the generator and the main power converter is connected in parallel with at least one component of the at least one voltage limited additional circuit and is configured to be in an open state during the start-up phase and in a closed state after the start-up phase.

3. The power converter arrangement as recited in claim 1, wherein the bypass switch is a mechanical switch.

4. The power converter arrangement as recited in claim 3, wherein the bypass switch is at least one of a contactor and a relay.

5. The power converter arrangement as recited in claim 1, wherein the at least one voltage-limiting additional circuit includes a step-down converter.

6. The power converter arrangement as recited in claim 5, wherein the bypass switch is configured to bypass at least one step-down converter switch.

7. The power converter arrangement as recited in claim 1, wherein the at least one voltage-Limiting additional circuit includes an auxiliary power converter.

8. The power converter arrangement as recited in claim 7, wherein the auxiliary power converter is directly connected to the grid so as to feed power directly to the grid.

9. The power converter arrangement as recited in claim 1, wherein the at least one voltage-limiting additional circuit includes a resistance chopper.

10. The power converter arrangement as recited in claim 1, wherein the at least one voltage-limiting additional circuit includes an electrically isolated DC/DC converter having an output coupled to the intermediate circuit capacitor.

11. The power converter arrangement as recited in claim 1, wherein the voltage-limiting circuit is active only during the start-up phase.

12. A method for converting a DC voltage to an AC voltage to be supplied to a grid in an arrangement including a photovoltaic generator configured to generate the DC voltage, a main power converter, a maximum power point controller configured to set a maximum power point voltage, and at least one voltage-limiting additional circuit configured to be active during a start-up phase of the photovoltaic generator so as to limit a voltage input to the main power convener during the start-up phase below a maximum power point voltage limit, the at least one voltage-limiting additional circuit being configured as a capacitive voltage divider in parallel with the photovoltaic generator and having a first capacitor and an intermediate circuit capacitor connected in series, the method comprising:
 dividing, using the at least one voltage-limiting circuit, the DC voltage between the capacitors such that the voltage input to the main power convener corresponds to the divided DC voltage at the intermediate capacitor;
 synchronizing, an output voltage of the m power converter with a mains voltage during the start-up phase;
 bypassing the at least one voltage-limiting additional circuit after the synchronizing; and
 connecting the main power converter to the grid: via an AC switch after the synchronizing.

13. The method as recited in claim 12, wherein the main power converter includes semiconductor switches, and further comprising setting, during a connecting of a bypass switch configured to activate and deactivate the at least one voltage-limiting circuit, a pulse pattern of activation signals for the semiconductor switches so as to load the photovoltaic generator so that the DC voltage breaks down to a voltage which at most corresponds to the maximum power point voltage limit.

14. The method as recited in claim 12, wherein the voltage-limiting circuit is active only during the start-up phase.

15. A method for converting a DC voltage to an AC voltage to be supplied to a grid in an arrangement including a photovoltaic generator configured to generate the DC voltage, a main power converter including semiconductor switches, a maximum power point controller configured to set a maximum power point voltage, and at least one voltage-limiting additional circuit configured to be active during a start-up phase of the photovoltaic generator so as to limit a voltage input to the main power converter during the start-up phase below a maximum power point voltage limit, the at least one voltage-limiting additional circuit being configured as a capacitive voltage divider in parallel with the photovoltaic generator and having a first capacitor and an intermediate Circuit capacitor connected in series, the method comprising:
 dividing, using the at least one voltage-limiting circuit, the DC voltage between the capacitors such that the voltage input to the main power converter corresponds to the divided DC voltage at the intermediate capacitor;
 setting, during a connecting of a bypass switch configured to activate and deactivate the at least one voltage-limiting circuit, a pulse pattern of activation signals for the semiconductor switches so as to load the photovoltaic generator so that the DC voltage breaks down to a voltage which at most corresponds to the maximum power point voltage limit;
 synchronizing an output voltage of the main power converter with a mains voltage during the start-up phase;
 connecting the main power converter to the grid via an AC switch after the synchronizing.

* * * * *